(12) United States Patent
Pandit et al.

(10) Patent No.: US 11,176,016 B1
(45) Date of Patent: Nov. 16, 2021

(54) DETECTING AND MANAGING ANOMALIES IN UNDERGROUND SENSORS FOR AGRICULTURAL APPLICATIONS

(71) Applicant: INTERNATIONAL BUSINESS MACHINES CORPORATION, Armonk, NY (US)

(72) Inventors: Sushain Pandit, Austin, TX (US); Kuntal Dey, New Delhi (IN); Charles Daniel Wolfson, Austin, TX (US); Jitendra Singh, Noida (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/028,390

(22) Filed: Sep. 22, 2020

(51) Int. Cl.
| | | |
|---|---|---|
| G06F 11/00 | (2006.01) | |
| G06F 11/30 | (2006.01) | |
| G06F 11/07 | (2006.01) | |
| G06F 11/32 | (2006.01) | |

(52) U.S. Cl.
CPC ...... *G06F 11/3089* (2013.01); *G06F 11/0772* (2013.01); *G06F 11/0781* (2013.01); *G06F 11/321* (2013.01); *G06F 11/327* (2013.01)

(58) Field of Classification Search
CPC ............. G06F 11/0751; G06F 11/0766; G06F 11/0769; G06F 11/0772; G06F 11/0775; G06F 11/0778; G06F 11/0781; G06F 11/0784; G06F 11/0787; G06F 11/08; G06F 11/14; G06F 11/1479; G06F 11/16; G06F 11/22; G06F 11/3089; G06F 11/321; G06F 11/327

USPC ........................................................ 714/1–57
See application file for complete search history.

(56) References Cited

U.S. PATENT DOCUMENTS

| | | | |
|---|---|---|---|
| 4,327,437 A | * | 4/1982 | Frosch ............... G11B 3/08516 244/194 |
| 10,078,890 B1 | | 9/2018 | Tagestad et al. |
| 2005/0126635 A1 | | 6/2005 | Addink et al. |

(Continued)

FOREIGN PATENT DOCUMENTS

| | | |
|---|---|---|
| CN | 102607498 A | 7/2012 |
| CN | 109115807 A | 1/2019 |
| IN | 201941019900 | 11/2019 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Sarai E Butler
(74) *Attorney, Agent, or Firm* — Robert D. Bean

(57) ABSTRACT

According to one embodiment, a method, computer system, and computer program product for detecting and managing anomalies in one or more sensors is provided. The present invention may include simulating, by one or more environmental models, an expected output of the one or more sensors; responsive to identifying that an actual output of the one or more sensors differs from the expected output by a threshold value, detecting one or more anomalous sensors; and performing one or more actions to manage the one or more anomalous sensors based on the presence of the one or more sensors within a plurality of anomaly reaction zones.

20 Claims, 6 Drawing Sheets

(56) References Cited

U.S. PATENT DOCUMENTS

| | | | | |
|---|---|---|---|---|
| 2008/0263405 | A1* | 10/2008 | Kaefer | G06F 11/008 714/38.14 |
| 2009/0216969 | A1* | 8/2009 | Winokur | G06F 11/2082 711/162 |
| 2013/0238936 | A1* | 9/2013 | Andrade | G06F 11/28 714/35 |
| 2016/0098309 | A1* | 4/2016 | Kim | G06F 11/1441 714/47.1 |
| 2016/0162348 | A1* | 6/2016 | Bernstein | G06F 11/079 714/37 |
| 2017/0090866 | A1* | 3/2017 | Vaughn | B60R 16/023 |
| 2018/0024900 | A1* | 1/2018 | Premerlani | G06F 21/554 714/41 |
| 2018/0060153 | A1* | 3/2018 | Innes | G06F 11/30 |
| 2018/0285767 | A1* | 10/2018 | Chew | G06N 20/00 |
| 2018/0299422 | A1 | 10/2018 | Pregesbauer | |
| 2019/0068455 | A1* | 2/2019 | Randolph | H04W 4/38 |
| 2019/0200187 | A1* | 6/2019 | Na | G08G 1/205 |

OTHER PUBLICATIONS

Chatterjee, "Anomaly Detection Strategies for IoT Sensors", printed May 26, 2020, 19 pages, https://medium.com/analytics-vidhya/anomaly-detection-strategies-for-iot-sensors-6281e84263df.

Choi, "Application of a Land Surface Model Using Remote Sensing Data for High Resolution Simulations of Terrestrial Processes", Remote Sens. Dec. 9, 2013, vol. 5, pp. 6838-6856.

Christiansen et al., "DeepAnomaly: Combining Background Subtraction and Deep Learning for Detecting Obstacles and Anomalies in an Agricultural Field", Sensors Article, vol. 16, Nov. 11, 2016, pp. 1-21.

Dorigo et al., "Evaluation of the ESA CCI soil moisture product using ground-based observations", Remote Sensing of Environment, vol. 162, (2015), pp. 380-395.

Jeba et al., "Anomaly Detection to Enhance Crop Productivity in Smart Farming", International Journal of Pure and Applied Mathematics, vol. 120, No. 6, 2018, p. 11503-11511.

Kamilaris et al., "Deep Learning in Agriculture: A Survey", 2018, 53 pages, https://arxiv.org/ftp/arxiv/papers/1807/1807.11809.pdf.

* cited by examiner

US 11,176,016 B1

DETECTING AND MANAGING ANOMALIES IN UNDERGROUND SENSORS FOR AGRICULTURAL APPLICATIONS

BACKGROUND

The present invention relates, generally, to the field of computing, and more particularly to environmental sensors.

The field of environmental sensors is concerned with devices which function to detect events, changes or conditions in their environment and communicate this data to connected storage or computing devices. With advances in micromachinery and easy-to-use microcontroller platforms, the use of sensors has greatly expanded, finding myriad uses within such contexts as manufacturing, agriculture, aerospace, medicine, robotics, homes, et cetera; the proliferation of sensors allows greater volume and accuracy of data to be collected, which in turn feeds increasingly sophisticated computing processes capable of realizing increasing benefits to, for example, industrial and agricultural processes, scientific research, and everyday life.

SUMMARY

According to one embodiment, a method, computer system, and computer program product for detecting and managing anomalies in one or more sensors is provided. The present invention may include simulating, by one or more environmental models, an expected output of the one or more sensors; responsive to identifying that an actual output of the one or more sensors differs from the expected output by a threshold value, detecting one or more anomalous sensors; and performing one or more actions to manage the one or more anomalous sensors based on the presence of the one or more sensors within a plurality of anomaly reaction zones.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
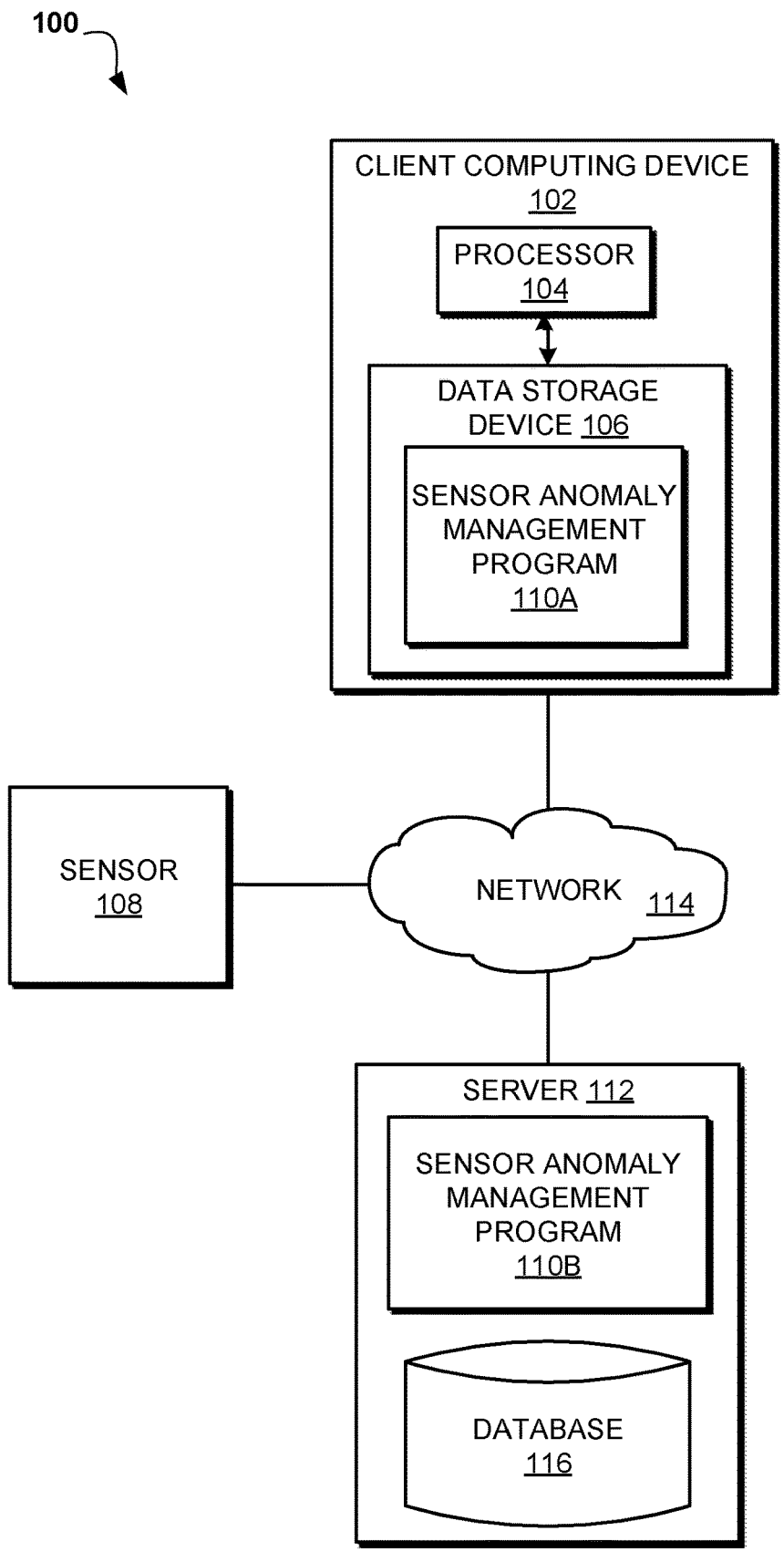
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to environmental sensors. The following described exemplary embodiments provide a system, method, and program product to, among other things, detect anomalies within sensor data by comparing against an environmental model, manage the anomalies based on anomaly reaction zones, and identify the potential causes of the anomalies. Therefore, the present embodiment has the capacity to improve the technical field of environmental sensors by quickly and reliably identifying anomalies within the sensor data, and then responding to the anomaly in the most appropriate fashion based on anomaly reaction zones grouping sensors by priority, where the zones are defined in part by user feedback, and providing the potential cause of the anomaly to prevent the anomaly from reoccurring.

As previously described, the field of environmental sensors is concerned with devices which function to detect events, changes or conditions in their environment and communicate this data to connected storage or computing devices. With advances in micromachinery and easy-to-use microcontroller platforms, the use of sensors has greatly expanded, finding myriad uses within such contexts as manufacturing, agriculture, aerospace, medicine, robotics, homes, et cetera; the proliferation of sensors allows greater volume and accuracy of data to be collected, which in turn feeds increasingly sophisticated computing processes capable of realizing increasing benefits to, for example, industrial and agricultural processes, scientific research, and everyday life.

However, sensors are not infallible; like all hardware, they are sensitive to external events, and this is perhaps exacerbated by the fact that by necessity sensors are often deployed in unprotected positions so as to be exposed to the environmental conditions they are intended to monitor. Sensors may be moved or damaged by impacts or wind or animals or seismic activity, may be corroded by moisture or chemicals, may be occluded or subject to unforeseen local conditions, or otherwise operationally interfered with in any number of ways. As a result, sensors are commonly prone to producing anomalous readings, or sensor data that is unexpected and/or incorrect. Any process or calculation relying on such anomalous data may be inaccurate or erroneous. However, maintenance of sensors is costly and frequent physical inspection is difficult, especially where sensors are located in remote or difficult to access locations. Furthermore, a delay in identifying the anomalies has costs associated as well; there is no way to recover the data that was not gathered during the periods where the sensor was malfunctioning.

Attempts have been made in the art to address these problems, for instance by eliminating or taking into consideration data that deviates suddenly or abnormally from pre-set tolerance thresholds, or by using prior patterns and environmental conditions that the sensor is designed to measure to detect anomalies. However, they suffer from at least the problem that prior patterns and environmental conditions limited to what the sensor is designed to measure give an incomplete picture which may inaccurately identify readings as anomalous, or may fail to identify anomalous readings; for instance, sometimes abnormal environmental events or conditions, such as a broken dam flooding a region, wildfires, a hurricane causing previously unheard of rainfall and windspeeds, et cetera, that may cause perfectly functioning sensors to record seemingly anomalous data. Or a malfunctioning sensor may be reporting erroneous data that matches past trends or falls within expected parameters but does not match measurements that might be expected based on a holistic assessment of the environmental events and conditions of the malfunctioning sensor. Furthermore, past patterns without sufficient additional context do not yield enough data to allow a system to determine the causes of anomalous data, for instance to determine if anomalous readings are caused by a malfunctioning sensor or abnormal environmental conditions, and/or to determine the cause of damage if a sensor is malfunctioning. As such, accurate readings arising from abnormal environmental conditions that may appear anomalous may be mistakenly flagged or thrown out as erroneous, or a sensor may be incorrectly flagged as malfunctioning. Additionally, when a sensor is correctly identified as malfunctioning, different levels of response may be merited to best address the issue based on the geographical region or logical grouping within which the sensor resides, which may be formulated based on a number of factors, such as value or importance of the sensor or the assets or process it is measuring, et cetera; this offers a more tailored solution as opposed to more monolithic approaches where anomalous sensors are dealt with the same way or without taking relevant factors into account, for instance resulting in sensors monitoring low-value assets or in hard-to-access locations being replaced when their data could be corrected for, causing unnecessary costs.

As such, it may be advantageous to, among other things, implement a system that quickly and reliably identifies anomalies in sensor data based on a holistic picture of environmental data, manages the anomalies by correcting or backfilling the observations with estimated values and providing a level of confidence in those estimated values, prioritize sensors or groups of sensors based on factors such as the importance of the data they gather or the preferred ways by which anomalies should be managed, and identify the potential cause of the anomaly so it can be prevented from recurring.

According to at least one embodiment, the invention is a system for detecting anomalies in environmental sensors by building an environmental model to predict the data that the sensor would be expected to collect based on quantifiable processes and conditions in the environment, and using the environmental model as well as historical sensor readings from similar contexts, current and past environmental conditions, data from other nearby and/or similar sensors, general trends and rules affecting sensor output, et cetera. The system then compares the expected output against the sensor's actual output; if the magnitude of deviance between the expected output and the actual output exceeds a threshold value, the system may identify the presence of an anomaly. In some embodiments, the system may detect anomalies in environmental sensors by use of remote sensing signatures and/or other nearby sensors. The threshold value may be predetermined, or may be created or adjusted based on machine learning, historical data, user feedback, et cetera.

In some embodiments, the system may employ a machine learning model to detect anomalies. The machine learning model may employ any of several methods to detect anomalies, such as clustering methods. In some embodiments, data collected from the feedback loop, or the semi-supervised learning stage, may be used to improve anomaly detection accuracy. In some embodiments, the features or attributes for the anomaly detection may be recent past temporal sensor data from potential anomalous and nearby sensors, expected output predicted by the environmental learning model, weather data such as precipitation or winds, logical fields for agricultural activity, unexpected weather events, remote sensing data, et cetera.

According to at least one embodiment, the invention is a system for managing detected anomalies in environmental sensors. The system may manage anomalies by correcting or reconstructing the anomalous sensor outputs, for example by use of the environmental model, and/or by machine learning models. In some embodiments the system may correct the anomaly data using standard regression techniques using the expected output simulated by the environmental model, remote sensing data, and weather data. The system may also, for example in cases where an environmental model is not available or not sufficiently accurate, manage detected anomalies by communicating alerts to a user to request or advise human intervention in changing or repairing the sensor, or to mark the anomaly as a false positive. For example, in at least one embodiment, managing a sensor refers to communicating data (such as programming instructions) to the sensor to cause the sensor to perform an action. The actions may include starting, stopping, or disabling the sensor. The actions may also include any read or write operation or operation of an input/output component of the sensor. In some embodiments, the system may operate the sensor to disable it, for example where continued operation of the sensor may result in damage to the sensor or danger to nearby people or assets.

In some embodiments, for example where the system has corrected or reconstructed the anomalous sensor outputs, the system may assign a confidence level to the corrected or reconstructed data, where the confidence level represents the probability that the corrected or reconstructed data is accurate, based for instance on the quality and/or quantity of available data used to produce the corrected data, the accuracy of the environmental model, et cetera. In some embodiments, the confidence level can be assessed based on which input data sets have been used in anomaly correction. For example, remote sensing data may not be available for the day of a detected anomaly. Hence only physical model outputs, weather, and nearby sensor readings would be used for anomaly correction. The confidence level might in such a case be assigned as "medium." If all the sources are available, then confidence level could be assigned as "high." In some embodiments, the confidence level may trigger one or more additional actions to manage the anomaly, based on the location of the anomalous sensor within the one or more anomaly reaction zones; low-confidence reconstructed data may be permissible in low-priority anomaly reaction zones, but if reconstructed data for an anomalous sensor in a high-priority anomaly reaction zone is assigned a low confidence level, the system may trigger additional actions such as notifying the user of the anomalous sensor, alerting the user to repair or replace the anomalous sensor, alerting the user to the low confidence level in the reconstructed data, and/or requesting feedback from the user. In some embodiments, the user may specify which confidence level triggers additional actions within each anomaly reaction zone or each priority or classification of anomaly reaction zone.

According to at least one embodiment, the system may group sensors into anomaly reaction zones, where the system manages anomalies within each zone differently based on which method of managing anomalies is most appropriate for a given anomaly reaction zone. An anomaly reaction zone may be a cluster or grouping of sensors, and the zone itself may for example be geographical, delineating a geographical region containing the sensors belonging to the grouping, or, for instance where the sensors are not grouped based on geographical proximity, the zone may be a logical construct, delineating all the sensors sharing certain characteristics or functions. The sensors may be grouped based on a number or combination of commonalities that inform how anomalies should be managed within the grouping; all sensors of the same type (i.e. rainfall sensors) may be grouped, for example, or all sensors associated with a single crop, industrial process, geographical area, et cetera may be grouped together. In some embodiments of the invention, each grouping of sensors, or anomaly reaction zone, may be assigned a priority, such as high, medium, and low. The priority of the anomaly reaction zone represents the tolerance for anomalies in sensor data gathered by the sensors within that anomaly reaction zone, or in other words, the need for accuracy in the sensor data. The priority may correspond to a number or combination of factors, such as the value of processes or assets associated with the sensors, the importance of the data gathered by a specific sensor or type of sensor, et cetera. For instance, if the anomaly reaction zone comprises sensors which are monitoring, for example, a high value crop or crucial industrial process, where small errors could have costly consequences, the anomaly reaction zone may be assigned a high priority. Conversely, where the anomaly reaction zone comprises sensors that are monitoring, for example, a low value crop or industrial process with loose tolerances, the anomaly reaction zone may be assigned a low priority. Likewise, sensors that are gathering data that is particularly important, such as oxygen sensors on a submarine, may be grouped into an anomaly reaction zone and assigned a high priority, whereas sensors that are gathering data that is less important, such as wind sensors in a strawberry patch, might be grouped into an anomaly reaction zone and assigned a low priority. In some embodiments, the priority may change over time where there are periods when anomalous data is more or less tolerable. For example, in agricultural contexts, the anomaly reaction zone may be assigned a high priority during the initial growth phase of a crop, when the crop is most sensitive to variations in sun and water, and may be devolved to a medium priority during the ripening phase, when the plant is less sensitive to environmental conditions.

In some embodiments, the system may manage anomalies based on the priority of the anomaly reaction zone to which the anomalous sensor belongs. For example, where an anomaly is detected in a low priority anomaly reaction zone, the system may simply auto-correct or reconstruct the anomalous data, as the need for accuracy is lower and the reconstructed data should suffice. In a medium-priority anomaly reaction zone, the system may auto-correct the data but notify a user of the anomaly. In a high-priority anomaly reaction zone, the system may alert the user to replace or repair the sensor.

In some embodiments, the system may adjust the anomaly detection threshold for data from a given sensor based on the priority of the anomaly reaction zone where the sensor is located. For example, sensors located within a high-priority anomaly reaction zone may reduce the magnitude of deviance between expected and actual sensor outputs that the system interprets as an anomaly, such that smaller discrepancies are flagged as anomalies. Conversely, in low priority anomaly reaction zones, the threshold value may be larger, such that only larger discrepancies are detected as anomalies.

The priority may also be based at least in part on the cost or ease of repair of the sensors; expensive or difficult to repair sensors may be grouped in to an anomaly reaction zone that is assigned a low priority, as repair or replacement of the sensor may not be feasible, and therefore anomalies must be tolerated. Conversely, cheaply or easily repaired sensors may be assigned a high priority, where replacement is more desirable than corrected anomalous data.

In some embodiments, the invention may be a system for identifying the cause of an anomaly. The system may employ a rule-based approach to identify potential causes of the anomaly, wherein the system parses data relevant to the anomalous sensor that is gathered contemporaneously with the detection of the anomaly, for instance data from other sensors monitoring the anomalous sensor or the same or similar environmental conditions to the anomalous sensor, weather data, scheduling data for a venue or event at the same time as the anomaly was detected, et cetera. In some embodiments, this data may include signatures or fingerprints formed by leveraging optical or microwave radar satellites. For instance, surface vegetation backscatter signal from synthetic aperture radar mounted satellites or normalized difference vegetation indices from optical satellites could be used to form or augment a signature of environmental attribute/surroundings that an agricultural sensor is expected to 'sense.' The system may further search historical data, or any other data that may provide context to the anomalous operation of the sensor. The system may parse the data to determine if one or more conditions have been met, where the conditions indicate a potential cause of the anomaly. For example, if the system determines that the conditions "it rained more than 20 mm in last 24 hours" or "over-irrigation happened and the sensor is placed at low elevation" are met, then the system may identify potential causes of the anomaly as "excessive rain" or "over-irrigation," respectively. In another example, if there was a hailstorm event in recent past that displaced the sensor from its original position, then the hailstorm event could be detected by weather (ground radar data) and remote sensing data. The conditions may be pre-provided, or may be adjusted based on user feedback.

In some embodiments, the system may solicit periodic feedback from the user to refine the functioning of the system. The system may provide a user interface to allow the user to interact with the system and communicate feedback, for example in the form of an application on a mobile device owned by or otherwise associated with the user, and may solicit feedback in the form of text messages and/or graphical elements such as pop-up windows, alert symbols, notification tray icons, et cetera. User feedback may be used to dynamically adjust the anomaly reaction zones. For instance, if several anomalies in a certain anomaly reaction zone were marked as false positives by the user (e.g., sensor was intentionally turned off), then the system may learn that the corresponding zone should be clustered (or re-clustered) as a low-priority anomaly reaction zone. Conversely, if the manual intervention was to change the sensor and the zone was high yield in past, then the system may learn that the anomaly reaction zone should be clustered (or re-clustered) as high-priority.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to detect anomalies within sensor data by comparing against an environmental model, manage the anomalies based on anomaly reaction zones, and identify the potential causes of the anomalies.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a sensor anomaly management program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

Sensor 108 may be any device configured to detect events, changes, or conditions in its environment and to communicate these events, changes or conditions to a computing device or data storage device on network 114. Despite being shown in the singular for simplicity of illustration, sensor 108 may represent any number or combination of sensors, such as moisture sensors, windspeed sensors, chemical sensors, optical sensors, vibrational sensors, load scales, et cetera, which are in danger of being operationally affected by environmental effects.

The server computer 112 may be a laptop computer, netbook computer, personal computer (PC), a desktop computer, or any programmable electronic device or any network of programmable electronic devices capable of hosting and running a sensor anomaly management program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the sensor anomaly management program 110A, 110B may be a program capable of detect anomalies within sensor data by comparing against an environmental model, manage the anomalies based on anomaly reaction zones, and identify the potential causes of the anomalies. The sensor anomaly management may be located on client computing device 102 or server 112 or on any other device located within network 114. Furthermore, sensor anomaly management may be distributed in its operation over multiple devices, such as client computing device 102 and server 112. The sensor anomaly management method is explained in further detail below with respect to FIG. 2.

Figure 2:
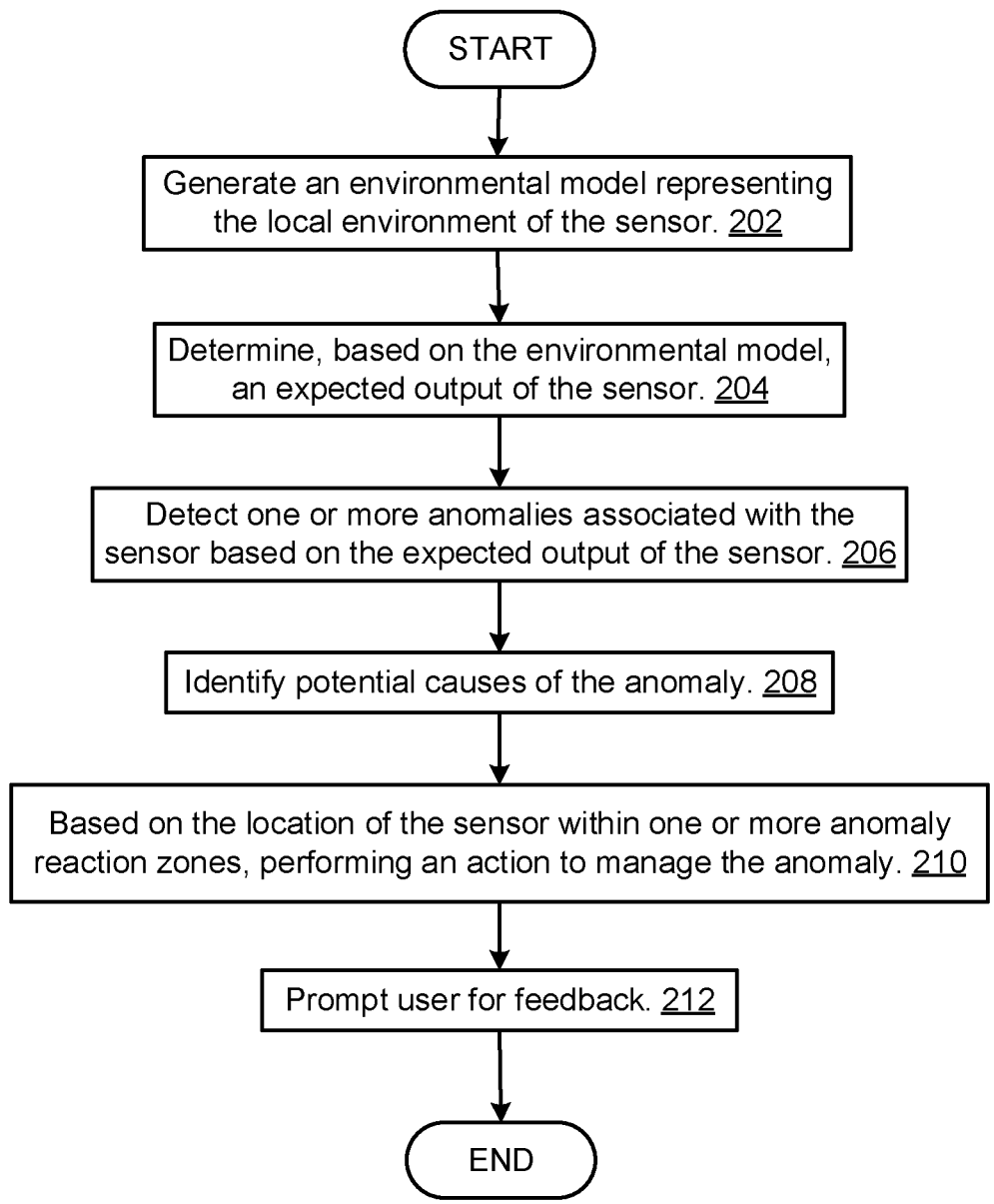
FIG. 2 is an operational flowchart illustrating a sensor anomaly management process according to at least one embodiment.

Referring now to FIG. 2, an operational flowchart illustrating a sensor anomaly management process 200 is depicted according to at least one embodiment. At 202, the sensor anomaly management program 110A, 110B generates an environmental model representing the local environment of the sensor 108. The environmental model may be a simulated representation of the environment around the sensor 108, modeling the local conditions, events, changes, et cetera that could affect the output and/or operation of the sensors 108. In some embodiments, each sensor 108 may be associated with its own environmental model that models conditions local to each sensor 108, for instance in situations where the sensors 108 are geographically distant from each other such that modeling environmental conditions between them is not cost-effective, and/or where the sensors 108 are so different in operation that their expected outputs can be modeled separately. In some embodiments, a single environmental model may model the environmental factors of multiple or all sensors 108, for example where the sensors 108 are close together and are affected by the same environmental conditions.

In some embodiments, the environmental model may simulate physical processes and conditions occurring in the sensor's 108 environment that may affect the output or operation of the sensors 108; for example, in the case of an environmental model simulating the environment of several agricultural sensors 108 within the same geographic region, such as a soil moisture sensor and a soil temperature sensor, the environmental model may simulate all or many of the physical processes or conditions affecting the environment in order to model the soil moisture and temperature, such as precipitation, sunlight, transpiration and evaporation, surface temperature, soil moisture flux, soil heat flux, soil composition, aquifer recharge, et cetera; by creating a complete or near-complete simulation of the environment, the environmental model can more accurately calculate an expected output of the sensors 108 within the environment. In another example, an environmental model simulating environmental conditions local to one or more chemical sensors within a vat might model the chemical inputs and outputs of the vats to model the acidity and other chemical properties of the vat contents.

In some embodiments, the environmental model may simulate aspects of the environment that may not be directly relevant to the expected output of sensors 108, but may be relevant to the operation of the sensors 108; in the example of photoelectrochemical sensors in a lab within a factory building, the environmental model might take into account the location of mechanical equipment, general trends and locations of employee movement, forces exerted by mechanical equipment (such as vibrations from a triphammer), operational hours of equipment, et cetera, to model conditions or events that might cause the sensors to be dislodged, knocked over, or damaged. Simulating aspects of the environment that are not directly relevant to the expected output but may be relevant to the operations of the sensors 108 is advantageous in that it provides useful data to enable sensor anomaly management program 110A, 110B to more accurately identify potential causes of anomalies.

The sensor anomaly management program 110A, 110B may generate the environmental model by, for example, using one of a number of different mathematical models designed to simulate the environment local to the sensors 108 based on input, and populating the model with the required initial conditions and static data necessary to provide a basis for the simulation, followed by dynamic input data that allows the simulation to adjust to changing conditions or unforeseen events. For instance, as in the case of multiple agricultural sensors including soil temperature and moisture, the sensor anomaly management program 110A, 110B may select an environmental model pertaining to terrestrial processes, and may populate it with initial conditions and static data such as the soil moisture, soil temperature, soil type, elevation, vegetation data, and depth layer condition; sensor anomaly management program 110A, 110B may then continually provide dynamic input data such as irrigation schedule, precipitation rate, temperature, relative humidity, solar radiation, atmospheric pressure, and wind field. The data and the mathematical model may be provided by a user and/or crawled or received or otherwise acquired from online repositories, weather forecasting applications, websites, et cetera.

At 204, the sensor anomaly management program 110A, 110B simulates, using the environmental model, an expected output of the sensor. The sensor anomaly management program 110A, 110B may determine the expected output of the sensor 108 based on the conditions simulated by the environmental model, which predicts the conditions that the sensor 108 was intended to measure by modeling the environmental factors that would produce those conditions. In some embodiments, when determining an expected output for a sensor 108, sensor anomaly management program 110A, 110B may take into account historical sensor data where the historical sensor data is an output from the sensor in the past, in comparable conditions to the present. For example, if the output of the sensor 108 is known to fluctuate based on the time of day, the sensor anomaly management program 110A, 110B may determine an expected output based on historical output from the sensor 108 at the corresponding time of day. The sensor anomaly management program 110A, 110B may take environmental data such as weather data into account in identifying corresponding historical sensor data, and/or may further modify the expected output of the sensor 108 based on the effects of weather and other environmental conditions on the output of both the particular sensor 108 and to similar sensors 108 in general. Simulating the expected output of the sensor 108 using the environmental model allows for an expected output that takes into account all available factors in the environment that may affect the sensor 108, and thereby increases the accuracy of the expected output.

In some embodiments, when determining an expected output for a sensor 108, sensor anomaly management program 110A, 110B may take into account sensor data from other sensors 108, such as when the other sensors 108 are nearby and monitoring the same conditions or conditions that are partially based on the condition that the sensor 108 is monitoring, such that the condition that the sensor 108 is monitoring could be mathematically determined by the output data from the nearby sensors 108. For example, if three soil moisture sensors are within adjacent fields of one another, the sensor anomaly management program 110A, 110B may expect the output of any one of them to be similar to the others. In another example, if there is a soil moisture sensor and a soil temperature sensor close together, sensor anomaly management program 110A, 110B may take into account the relationship between soil temperature and soil moisture, and may react to high temperature readings from the soil temperature sensor by lowering the expected output of the soil moisture sensor.

The sensor anomaly management program 110A, 110B may take any amount or combination of the aforementioned data sources into account when determining an expected output, and use the data sources to train a machine learning model to identify the expected output for a sensor 108 with increasing accuracy as the amount and/or quality of available data increases.

At 206, sensor anomaly management program 110A, 110B detects one or more anomalies associated with the sensor 108 based on the expected output of the sensor 108. The sensor anomaly management program 110A, 110B may compare the actual output of the sensor 108 against the expected output of the sensor 108; if the magnitude of the deviance between the expected output and the actual output exceeds a threshold value, where the threshold value represents the amount of deviance beyond which an output should be considered anomalous, then sensor anomaly management program 110A, 110B flags the output as an anomaly and/or flags the sensor 108 as operating in an anomalous condition. The threshold value may be pre-supplied by a user, and/or may be refined in response to user feedback, self-reinforcement of machine learning models, et cetera. Where the expected output is accurate, deviation from the expected output is highly likely to signal the presence of an anomaly, and fine-tuning the threshold value through feedback and machine learning increases the accuracy of anomaly detection.

In some embodiments of the invention, a confidence value may be assigned to the environmental model, which may reflect the confidence that the expected output is correct; this confidence value may be based on the amount of static and/or dynamic data available to create or train the environmental model, and/or the accuracy and/or quantity of past expected outputs created by the model; the threshold value for the deviance between the expected and actual outputs may, in such embodiments, be based on the confidence value of the environmental model, for instance such that where the environmental model is founded on a large quantity of environmental data and the expected output is accurate, the threshold value may be smaller to reflect the lower margin of potential error, and vice versa. In some embodiments of the invention, the threshold value may differ based on the anomaly reaction zone within which the sensor is located. If the anomaly reaction zone is high priority, the threshold value may be smaller, such that sensor anomaly management program 110A, 110B flags smaller deviations from the expected output as anomalies. If the anomaly reaction zone is low priority, the threshold value may be relatively larger, such that sensor anomaly management program 110A, 110B only flags significant deviations as anomalies.

At 208, sensor anomaly management program 110A, 110B identifies potential causes of the one or more anomalies. The sensor anomaly management program 110A, 110B may employ a rule-based approach to identify potential causes of the anomaly, wherein sensor anomaly management program 110A, 110B parses data relevant to the anomalous sensor 108 that is gathered contemporaneously or within a threshold period of time from the detection of the anomaly, where the threshold period of time may represent the temporal window where data is most likely to be relevant to the occurrence of the anomaly. The sensor anomaly management program 110A, 110B may parse data that pertains to the local environment and conditions of the sensor 108 at the time the anomaly was detected, for example from other sensors 108 monitoring the anomalous sensor 108 or the same or similar environmental conditions to the anomalous sensor 108, weather data, scheduling data for a venue or event at the same time as the anomaly was detected, et cetera; the sensor anomaly management program 110A, 110B may further search historical data, or any other data that may provide context to the anomalous operation of the sensor 108. The sensor anomaly management program 110A, 110B may parse the data to determine if one or more conditions have been met, where the conditions indicate a potential cause of the anomaly. For example, if the system determines that the conditions "it rained more than 20 mm in last 24 hours" or "over-irrigation happened and the sensor is placed at low elevation" are met, then the system may identify potential causes of the anomaly as "excessive rain" or "over-irrigation," respectively. In some situations, such as where the sensor 108 is indoors and is isolated from weather or natural events except for natural disasters, weather data may be unavailable; in such cases, sensor anomaly management program 110A, 110B may rely on whatever indoor environmental data may be available, which may include indoor sensors, thermostats, the presence of active alarms or operating machinery in the building, the presence of employees, et cetera. The rules or conditions, and the potential causes that they implicate either individually or in combination with other conditions, may be pre-provided, and/or refined continuously based on user feedback or self-reinforcement where sensor anomaly management program 110A, 110B employs a machine learning model to detect potential causes. Detecting the potential causes of anomalies helps to determine why sensors 108 are giving anomalous readings, and informs sensor anomaly management program 110A, 110B's management of the anomalous data, and enables sensor anomaly management program 110A, 110B to communicate to users valuable context and guidance regarding how sensors 108 reached an anomalous state, what anomalous readings mean in the context offered by the environmental model and other data available to sensor anomaly management program 110A, 110B, how best to repair or otherwise deal with the anomalous sensor 108, and/or how to mitigate or prevent damage in the future, improving the experience of the user and the efficiency of the system.

At 210, sensor anomaly management program 110A, 110B performs an action to manage the anomaly based on the location of the sensor 108 within one or more anomaly reaction zones. The anomaly reaction zones may be groupings of sensors 108 that share commonalities that inform how anomalies occurring within the group should be handled, and for which all anomalies occurring within sensors 108 of the group are handled in the same way. For example, all chemical sensors within a single mixing tank may be grouped together, as none of the sensors can be easily accessed so anomalies must be addressed via correction. The actions by which sensor anomaly management program 110A, 110B deals with anomalies within a given anomaly reaction zone may be predetermined and/or initially supplied by a user, and/or may be refined over time based on user feedback, events, and self-reinforcement from machine-learning models. Managing the anomaly based on the location of the sensor 108 within one or more anomaly reaction zones allows the sensor anomaly management program 110A, 110B to tailor the anomaly response to the specific traits of the sensor 108 based on the anomaly reaction zone to minimize unnecessary replacement of sensors, ensure that the accuracy of sensor 108 measurements is maintained commensurate with the importance of those measurements, and generally improves the cost-effectiveness of the system and the integrity of assets, processes, or conditions that depend on accurate readings from sensor 108.

The sensor anomaly management program 110A, 110B may manage anomalies by any number or combination of actions intended to address or correct the erroneous sensor data. The sensor anomaly management program 110A, 110B may correct or reconstruct the anomalous sensor data by, for example, using one of any number of statistical regression models to regression fit a curve that passes through the most number of data points that were output by the sensor 108 in the past, to extrapolate data points that ought to have been output during the period where the sensor 108 was operating anomalously. In some embodiments, for instance where historical data is incomplete or unavailable, the sensor anomaly management program 110A, 110B may utilize the expected output to inform the corrected data. The sensor anomaly management program 110A, 110B may assign a confidence level to the corrected or reconstructed data, where the confidence level represents the probability that the corrected or reconstructed data is accurate, based for instance on the quality and/or quantity of available data used to produce the corrected data, the accuracy of the environmental model, et cetera. Correcting or reconstructing sensor data allows gaps in sensor measurements to be repaired, mitigating the potential data loss caused by the anomalous sensor.

The sensor anomaly management program 110A, 110B may manage detected anomalies by performing an action relating to communicating with a user, for example to inform the user as to the presence and/or details of an anomaly, request or advise human intervention in changing or repairing the sensor 108, and/or to solicit feedback.

In some embodiments, for instance where sensor anomaly management program 110A, 110B has determined the potential cause of the anomaly to be damage or an environmental condition that could lead to additional damage to the sensor 108, sensor anomaly management program 110A, 110B may manage the anomaly by operating the anomalous sensor 108 to disable it.

In some embodiments, sensor anomaly management program 110A, 110B may perform actions to manage the anomaly based on the magnitude of the deviance between the expected output and the actual output of the sensor 108; for example, for deviances beyond the threshold value that qualifies them as an anomaly but below a certain magnitude, the sensor anomaly management program 110A, 110B may merely correct the data; for deviances within an intermediate range of magnitude beyond the first, the sensor anomaly management program 110A, 110B may communicate with the user, for example to notify the user of the anomaly, request shutdown, replacement or repair of the sensor 108, and for magnitudes beyond the intermediate range, sensor anomaly management program 110A, 110B may shut down the sensor 108.

At 212, sensor anomaly management program 110A, 110B prompts the user for feedback. The sensor anomaly management program 110A, 110B may provide a user interface to allow the user to interact with the system and communicate feedback, for example in the form of an application on a client computing device 102, and may solicit feedback in the form of text messages, audio cues, text-to-speech, and/or graphical elements such as pop-up windows, alert symbols, notification tray icons, et cetera. User feedback may be used to dynamically adjust the anomaly reaction zones, as well as to improve the one or more machine learning models employed by sensor anomaly management program 110A, 110B.

Figure 3:
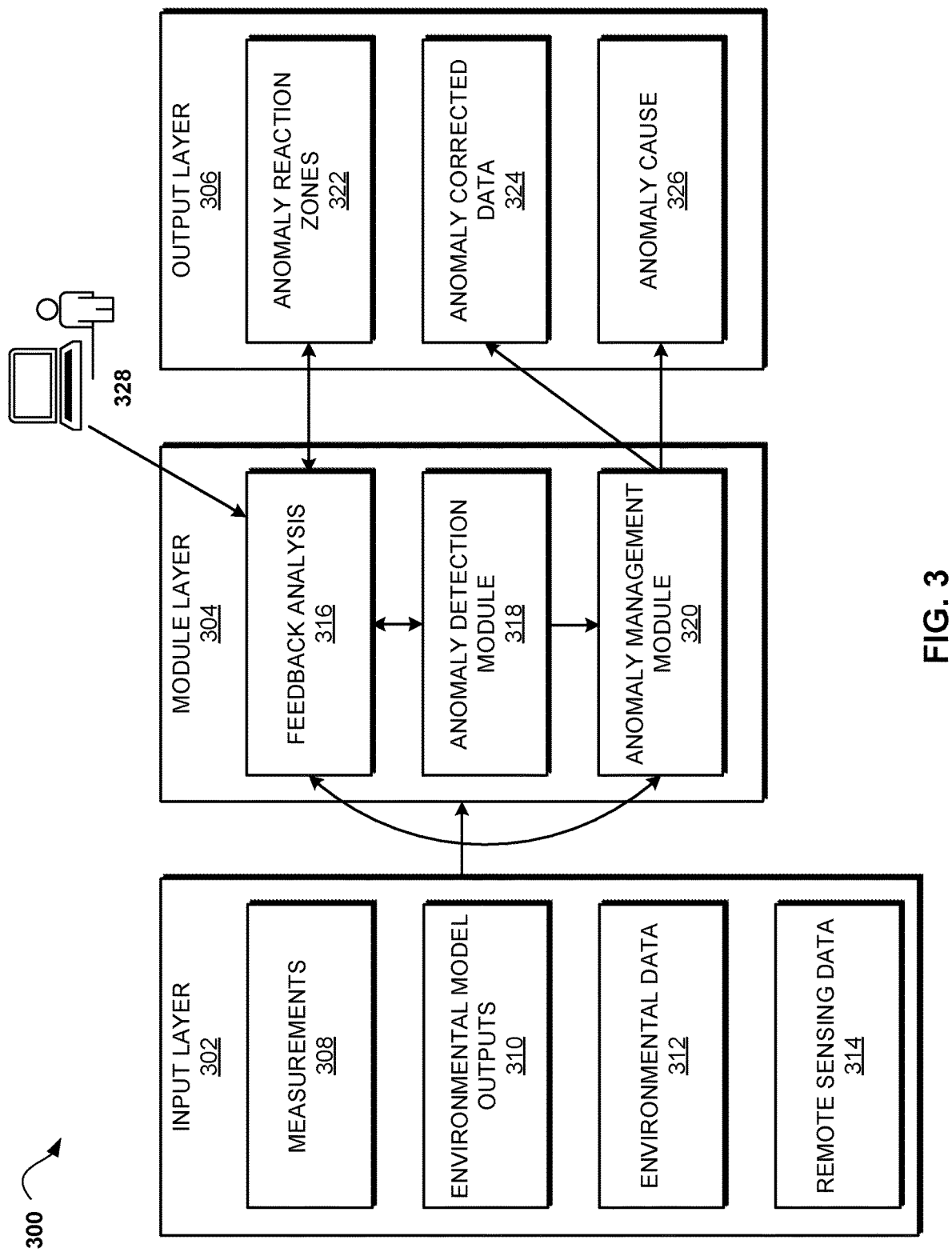
FIG. 3 depicts a workflow outline of an implementation of a sensor anomaly management process according to at least one embodiment.

Referring now to FIG. 3, a workflow outline of an implementation 300 of a sensor anomaly management process 200 is depicted according to at least one embodiment. The implementation comprises an input layer 302 which receives input data and passes it to module layer 304 which contains the modules that execute anomaly management process 200 on the input data and passes the results to output layer 306. Input layer 302 receives measurements 308, environmental model outputs 310, environmental data 312, and remote sensing data 314. The module layer 304 comprises three layers: the feedback analysis layer 316, the anomaly detection module 318, and the anomaly management module 320. The anomaly detection module 318 receives the input data and passes any anomalies it detects to the anomaly management module 320. The anomaly management module 320 may, based on the anomaly reaction zones, output anomaly corrected data 324 and potential causes of the anomaly 326. Feedback analysis 316 will analyze any feedback it receives from a user 328, and outputs a spatial map representing the anomaly reaction zones 322 based on the feedback, and may continue to revise the anomaly reaction zones 322 as additional feedback is received. Feedback analysis 316 may further communicate with the anomaly detection module 318 and anomaly management module 320 to incorporate user feedback to improve the operation of the respective modules.

It may be appreciated that FIGS. 2-3 provide only illustrations of one implementation and do not imply any limitations with regard to how different embodiments may be implemented. Many modifications to the depicted environments may be made based on design and implementation requirements.

Figure 4:
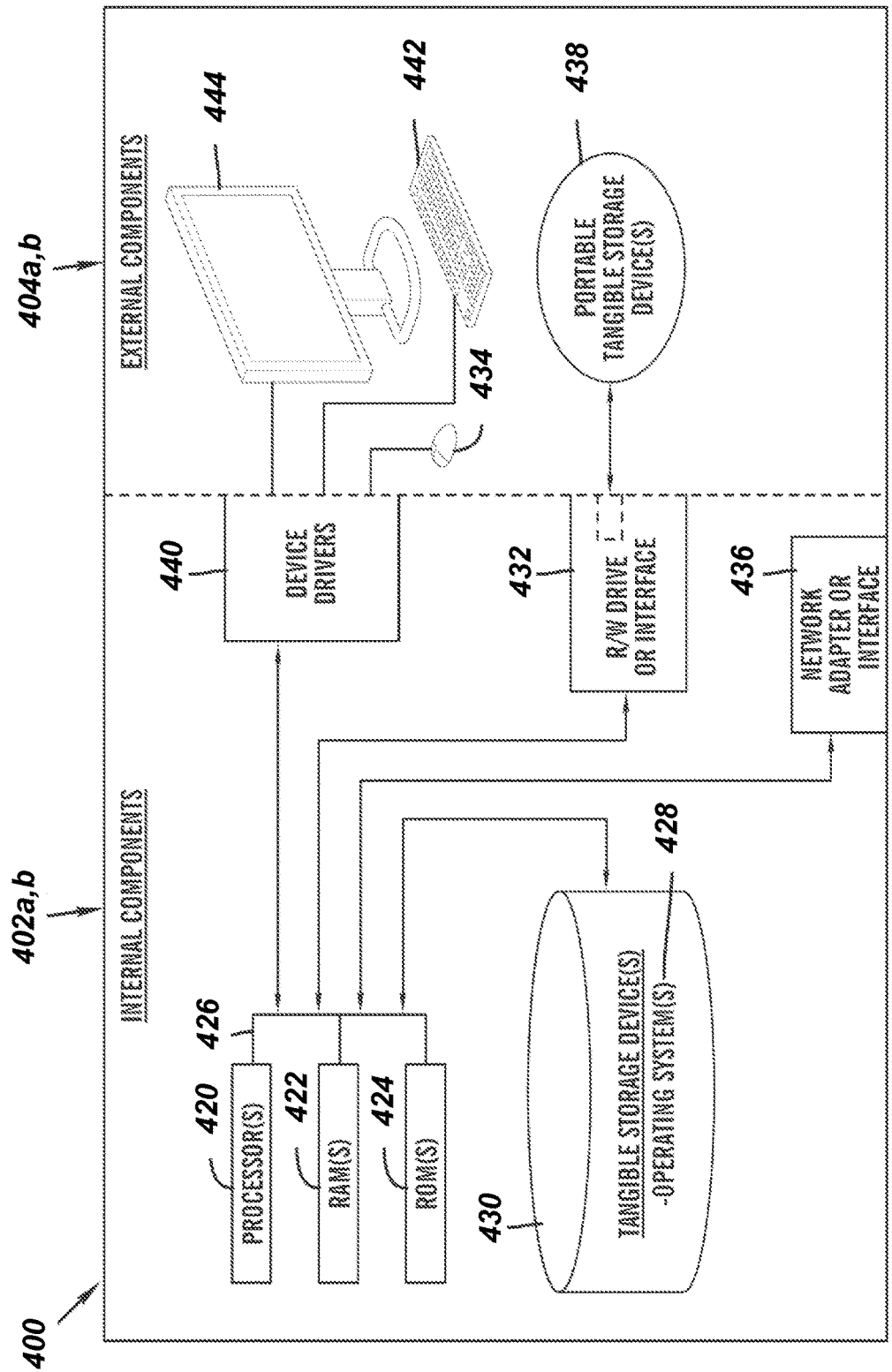
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the sensor anomaly management program 110A in the client computing device 102, and the sensor anomaly management program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the sensor anomaly management program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The sensor anomaly management program 110A in the client computing device 102 and the sensor anomaly management program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the sensor anomaly management program 110A in the client computing device 102 and the sensor anomaly management program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
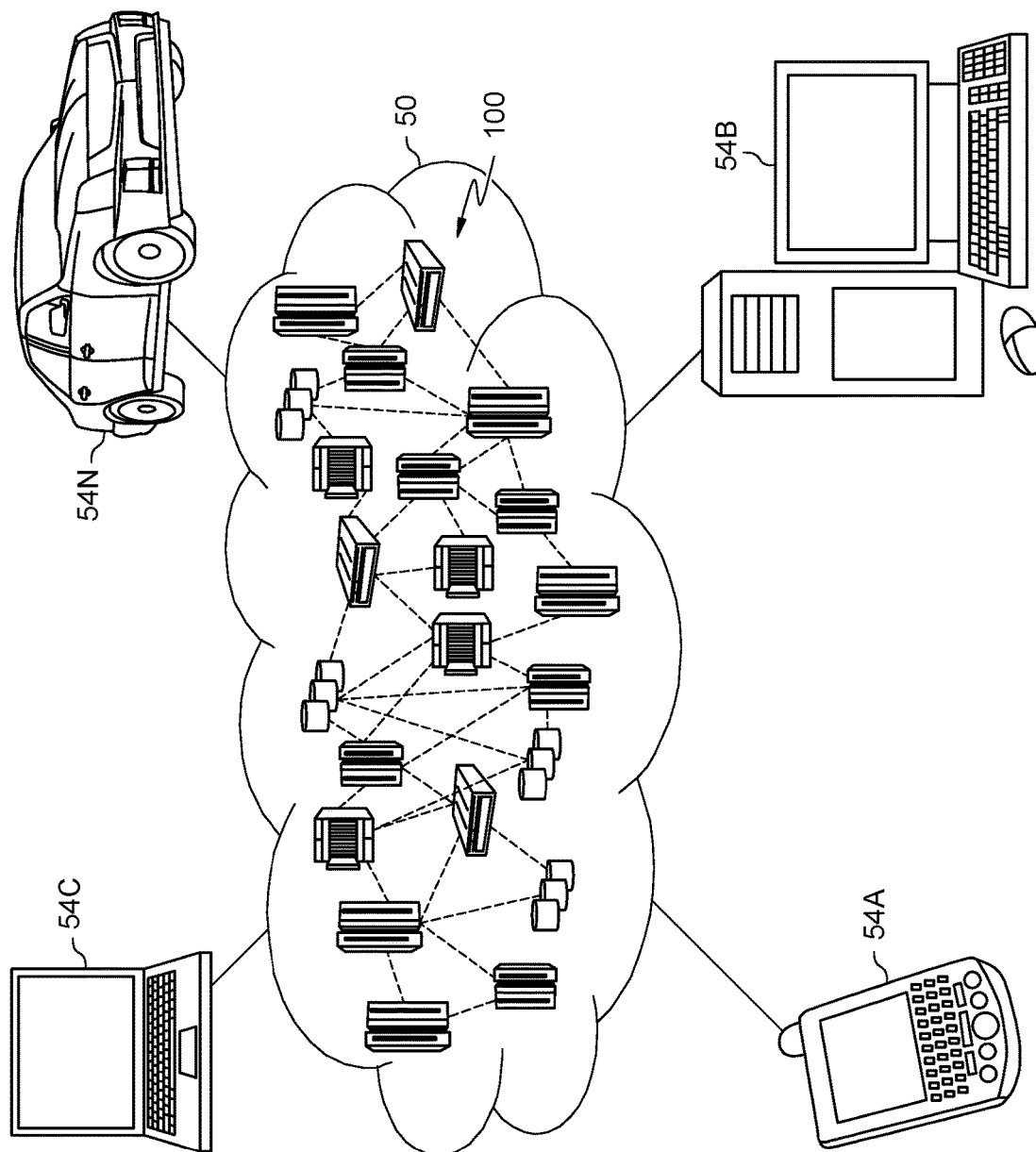
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
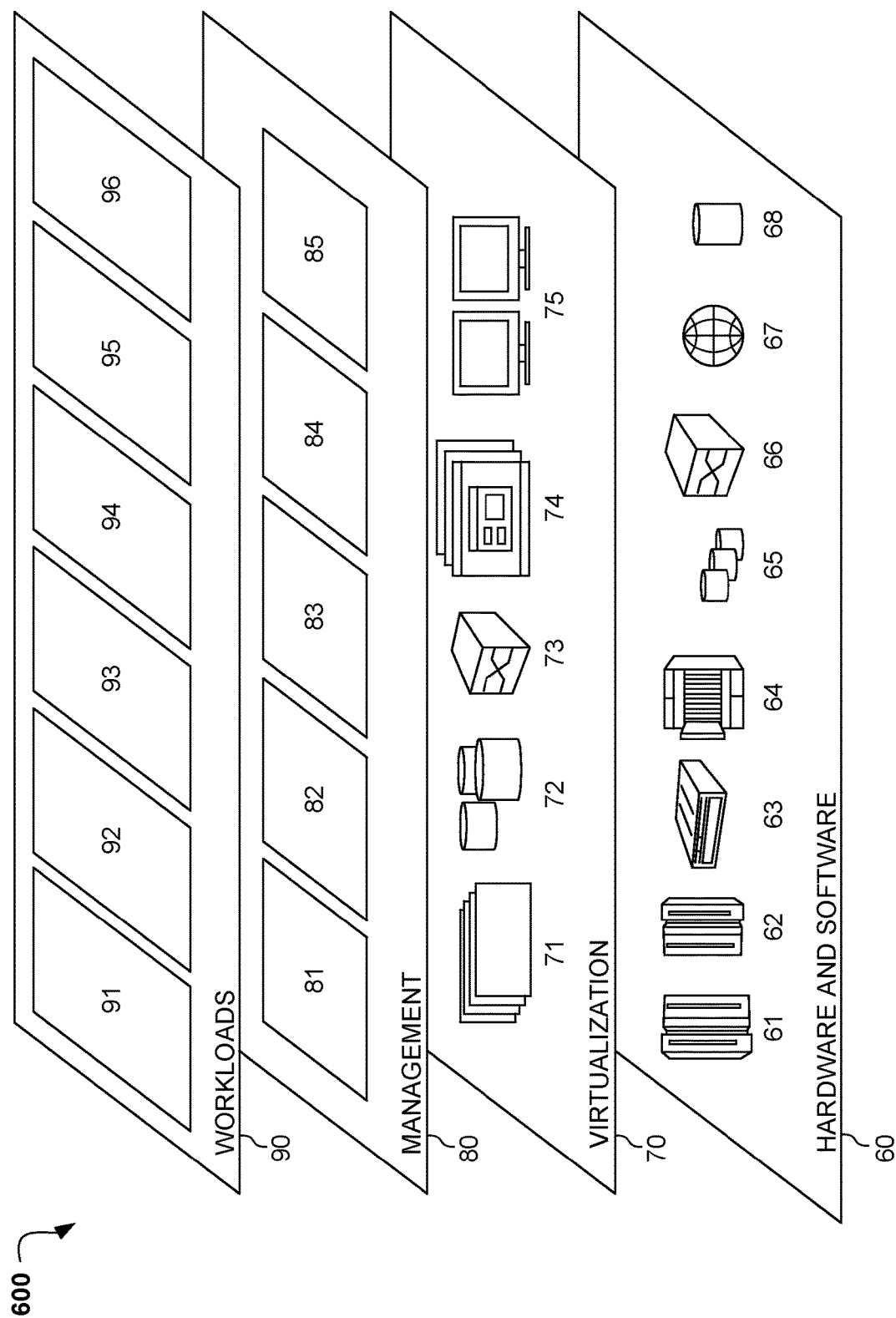
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor anomaly management 96. The sensor anomaly management 96 may be enabled to detect anomalies within sensor data by comparing against an environmental model, manage the anomalies based on anomaly reaction zones, and identify the potential causes of the anomalies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing anomalies in one or more sensors, the method comprising: simulating, by one or more environmental models, an expected output of the one or more sensors; responsive to identifying that an actual output of at least one of the one or more sensors differs from the expected output by a threshold value, flagging one or more sensors as one or more anomalous sensors and an output of the one or more anomalous sensors as one or more anomalies; and performing one or more actions to manage the one or more anomalous sensors based on which anomaly reaction zone of a plurality of anomaly reaction zones the one or more sensors are present within.

2. The method of claim 1, further comprising:
responsive to one or more conditions being met within a plurality of environmental data, identifying one or more potential causes for the one or more anomalies.

3. The method of claim 1, wherein the one or more actions are selected from a list comprising:
reconstructing output from the one or more anomalous sensors based on the expected output, notifying a user of the one or more anomalous sensors, alerting a user to repair or replace the one or more anomalous sensors, and disabling the one or more anomalous sensors.

4. The method of claim 1, wherein a reconstructed output corresponding to the one or more anomalous sensors is assigned a confidence level based on a predicted accuracy of the reconstructed output.

5. The method of claim 1, wherein the plurality of anomaly reaction zones are assigned one or more priorities, wherein the priorities represent a level of tolerance for anomalous data associated with the plurality of anomaly reaction zones.

6. The method of claim 1, further comprising:
dynamically adjusting at least one of the plurality of anomaly reaction zones based on user feedback or a changing priority of the at least one anomaly reaction zone.

7. The method of claim 1, wherein the threshold value is based on the presence of the one or more sensors within the plurality of anomaly reaction zones.

8. A computer system for managing anomalies in one or more sensors, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: simulating, by one or more environmental models, an expected output of the one or more sensors; responsive to identifying that an actual output of at least one of the one or more sensors differs from the expected output by a threshold value, flagging one or more sensors as one or more anomalous sensors and an output of one or more anomalous sensors as one or more anomalies; and performing one or more actions to manage the one or more anomalous sensors based on which anomaly reaction zone of a plurality of anomaly reaction zones the one or more sensors are present within.

9. The computer system of claim 8, further comprising:
responsive to one or more conditions being met within a plurality of environmental data, identifying one or more potential causes for the one or more anomalies.

10. The computer system of claim 8, wherein the one or more actions are selected from a list comprising:
reconstructing output from the one or more anomalous sensors based on the expected output, notifying a user of the one or more anomalous sensors, alerting a user to repair or replace the one or more anomalous sensors, and disabling the one or more anomalous sensors.

11. The computer system of claim 8, wherein a reconstructed output corresponding to the one or more anomalous sensors is assigned a confidence level based on a predicted accuracy of the reconstructed output.

12. The computer system of claim 8, wherein the plurality of anomaly reaction zones are assigned one or more priorities, wherein the priorities represent a level of tolerance for anomalous data associated with the plurality of anomaly reaction zones.

13. The computer system of claim 8, further comprising:
dynamically adjusting at least one of the plurality of anomaly reaction zones based on user feedback or a changing priority of the at least one anomaly reaction zone.

14. The computer system of claim 8, wherein the threshold value is based on the presence of the one or more sensors within the plurality of anomaly reaction zones.

15. A computer program product for managing anomalies in one or more sensors, the computer program product comprising: one or more computer-readable tangible storage medium and program instructions stored on at least one of the one or more tangible storage medium, the program instructions executable by a processor to cause the processor to perform a method comprising: simulating, by one or more environmental models, an expected output of the one or more sensors; responsive to identifying that an actual output of at least one of the one or more sensors differs from the expected output by a threshold value, flagging one or more sensors as one or more anomalous sensors and an output of the one or more anomalous sensors as one or more anomalies; and performing one or more actions to manage the one or more anomalous sensors based on which anomaly reaction zone of a plurality of anomaly reaction zones the one or more sensors are present within.

16. The computer program product of claim 15, further comprising: responsive to one or more conditions being met within a plurality of environmental data, identifying one or more potential causes for the one or more anomalies.

17. The computer program product of claim 15, wherein the one or more actions are selected from a list comprising:

reconstructing output from the one or more anomalous sensors based on the expected output, notifying a user of the one or more anomalous sensors, alerting a user to repair or replace the one or more anomalous sensors, and disabling the one or more anomalous sensors.

18. The computer program product of claim 15, wherein a reconstructed output corresponding to the one or more anomalous sensors is assigned a confidence level based on a predicted accuracy of the reconstructed output.

19. The computer program product of claim 15, wherein the plurality of anomaly reaction zones are assigned one or more priorities, wherein the priorities represent a level of tolerance for anomalous data associated with the plurality of anomaly reaction zones.

20. The computer program product of claim 15, further comprising:

dynamically adjusting at least one of the plurality of anomaly reaction zones based on user feedback or a changing priority of the at least one anomaly reaction zone.

* * * * *